US005653945A

United States Patent [19]

Gathje et al.

[11] Patent Number: 5,653,945

[45] Date of Patent: Aug. 5, 1997

[54] METHOD FOR PROCESSING GOLD-BEARING SULFIDE ORES INVOLVING PREPARATION OF A SULFIDE CONCENTRATE

[75] Inventors: John C. Gathje, Longmont, Colo.; Gary L. Simmons, Albuquerque, N. Mex.

[73] Assignee: Santa Fe Pacific Gold Corporation, Albuquerque, N. Mex.

[21] Appl. No.: 423,839

[22] Filed: Apr. 18, 1995

[51] Int. Cl.[6] .......... B03D 1/00; C01G 7/00

[52] U.S. Cl. .......... 423/26; 423/27; 423/29; 423/30

[58] Field of Search .......... 423/26, 27, 29, 423/30, 579, DIG. 15

[56] References Cited

U.S. PATENT DOCUMENTS

| | | | |
|---|---|---|---|
| 809,959 | 1/1906 | Kirby | 209/166 |
| 1,045,970 | 12/1912 | Greenway | 209/166 |
| 1,505,323 | 8/1924 | Eberenz | 209/166 |
| 3,655,044 | 4/1972 | Delaney | 209/167 |
| 3,834,896 | 9/1974 | Eisele et al. | 423/26 |
| 4,571,263 | 2/1986 | Weir et al. | 423/150.4 |
| 4,571,264 | 2/1986 | Weir et al. | 423/150.4 |
| 4,605,439 | 8/1986 | Weir | 423/140 |
| 4,797,202 | 1/1989 | Klimpel et al. | 423/26 |
| 5,013,359 | 5/1991 | Fair et al. | 423/26 |
| 5,074,993 | 12/1991 | Kerr et al. | 209/167 |
| 5,245,110 | 9/1993 | Van Dijk et al. | 423/579 |

OTHER PUBLICATIONS

Burger, "Froth Flotation Development: This Industry Workhorse From Strength to Strength," E&MJ (Sep. 1983) pp. 67–75.

Onstott et al., "By–Product Molybdenum Flotation From Copper Sulfide Concentrate With Nitrogen Gas in Enclosed Wemco Nitrogen Flotation Machines", Preprint No. 84–65 (1984) Society of Mining Engineers of AIME, no month.

Berglund et al., "Influence of Different Gases In Flotation Of Sulphide Minerals," Proceedings of An Engineering Foundation Conference on Advances in Coal and Mineral Processing Using Flotation (1989) pp. 71–76, Society for Mining, Metallurgy and Exploration, Inc., Littleton, Colorado, Dec., 1989.

Martin et al., "Complex Sulphide Ore Processing With Pyrite Flotation By Nitrogen," International Journal of Mineral Processing, 26 (1989) pp. 95–110, Elsevier Science Publishers B.V., Amsterdam, no month.

Jones, "Some Recent Developments in the Measurement and Control of Xanthate, Perxanthate, Sulphide, and Redox Potential in Flotation," International Journal of Mineral Processing, 33 (1991) pp. 193–205, Elsevier Science Publishers B.V., Amsterdam, no month.

(List continued on next page.)

*Primary Examiner*—Steven Bos
*Attorney, Agent, or Firm*—Holme Roberts & Owen LLP

[57] ABSTRACT

Provided is a method for processing a gold-bearing sulfide ore which involves maintaining the ore in a substantially oxygen free environment, preferably beginning with comminution of the ore and ending when a desired final concentrate, enriched in sulfide minerals, is obtained by flotation. In one embodiment, nitrogen gas is used to substantially prevent contact between the ore and air during comminution of the ore and during flotation operations. It is believed that oxygen gas present in air detrimentally affects the recovery of sulfide minerals in a flotation concentrate through surface oxidation of sulfide mineral particles. The use of a gas such as nitrogen can significantly reduce the potential for such surface oxidation. Additionally, gases separated from an oxygen plant may be beneficially used, with an oxygen gas stream being used, for example, for pressure oxidation of sulfide mineral materials, and with a nitrogen gas stream being used in comminution and/or flotation operations, resulting in advantageous use of a nitrogen gas by-product stream which has previously been vented to the atmosphere as waste.

39 Claims, 9 Drawing Sheets

OTHER PUBLICATIONS

Berglund, "Pulp Chemistry in Sulphide Mineral Flotation", International Journal of Mineral Processing, 33 (1991) pp. 21–31, Elsevier Science Publishers B.V., Ambsterdam.

Klymowsky et al., "The Role of Oxygen in Xanthate Flotation of Galena, Pyrite and Chalcopyrite," CIM, Bulletin for June, pp. 683–688 (1970), Jun., 1970.

Rao et al., "Possible Applications of Nitrogen Flotation of Pyrite," Minerals, Materials and Industry (ed. M.T. Jones), Institute of Mining and Metallurgy, pp. 285–293 (1990), no month.

Rao et al., "Adsorption of Anyl Xanthate at Pyrrhotite in the Presence of Nitrogen and Implications in Flotation," Can. Metall. Q., vol. 30, No. 1, pp. 1–6 (1990), no month.

Xu et al., "Sphalerite Reverse Flotation Using Nitrogen," Proc. Electrochem Soc., vol. 92–17, Proc. Int. Symp. Electrochem. Miner. Met. Process. III, 3rd, pp. 170–190 (1992), no month.

Van Deventer et al., "The Effect of Galvanic Interaction of the Behaviour of the Froth Phase During the Flotation of a Complex Sulfide Ore," Minerals Engineering, vol. 6, No. 12, pp. 1217–1229 (1993), no month.

Author unknown, title unknown, Chapter IV, Gases and Aeration, pp. 63–70, date unknown.

Plaskin et al., "Role of Gases in Flotation Reactions," Acacemy of Sciences, U.S.S.R. Moscow, date unknown.

METHOD FOR PROCESSING GOLD-BEARING SULFIDE ORES INVOLVING PREPARATION OF A SULFIDE CONCENTRATE

FIELD OF THE INVENTION

The present invention involves a method for processing gold-bearing sulfide ores to facilitate recovery of gold from the sulfide ore. In particular, the present invention involves flotation processing of gold-bearing sulfide ores in a manner that reduces problems associated with conventional flotation to produce an ore concentrate. The present invention also involves the flotation processing in combination with oxidative treating, such as pressure oxidation, and use of by-product gas from an oxygen plant used to supply oxygen gas for the oxidative treating.

BACKGROUND OF THE INVENTION

Significant amounts of gold are found in sulfide ores, in which the gold is associated with sulfide mineralogy. The gold is difficult to recover from such sulfide ores, because the gold is typically bound in sulfide mineral grains in a manner that renders the ore refractory to many traditional gold recovery techniques, such as direct cyanidation of the ore. Therefore, sulfide ores are commonly treated to chemically alter the sulfide mineral to permit dissolution of the gold during subsequent gold recovery operations.

One technique for treating a gold-bearing sulfide ore in preparation for gold recovery is to subject the ore to an oxidative treatment to oxidize sulfide sulfur in the sulfide minerals, thereby rendering the gold more susceptible to recovery. One method for oxidatively treating a sulfide ore is pressure oxidation, in which a slurry of the ore is subjected to oxygen gas in an autoclave at elevated temperature and pressure to decompose the sulfide mineral, freeing the gold for subsequent recovery. Other oxidative treating methods include roasting and bio-oxidation of the ore in the presence of air or oxygen gas.

Treating whole ores by pressure oxidation or by oxidative roasting is expensive. Part of the expense is due to energy consumed in heating gold-barren gangue material in the whole ore, and especially the energy required to heat water in which the gangue material is slurried in the case of pressure oxidation. Also, process equipment for treating a whole ore must be sized to accommodate the throughout of gangue material, in addition to the throughput of the gold-bearing sulfide minerals, thereby significantly adding to the cost of process equipment. Moreover, side reactions may occur involving gangue material which can detrimentally affect the oxidative treating or can produce hazardous materials which require special handling.

One way to reduce the high energy and process equipment costs associated with oxidative treating of a whole ore, as well as the potential for problems associated with side reactions, would be to remove gangue material from the ore prior to the oxidative treatment. For example, one method that has been used to remove gangue material from gold-bearing sulfide ores is flotation. In flotation, air is bubbled through a slurry of ore particles which have been treated with reagents and the particles of the ore which are less hydrophilic tend to rise with the air bubbles, thereby permitting separation of the ore into two fractions. Flotation has been used to prepare concentrates of gold-bearing sulfide minerals which are rich in the sulfide minerals and relatively free of gangue material. One problem with flotation of many gold-bearing sulfide ores, however, is that a significant amount of the gold-bearing sulfide mineral often reports to the wrong flotation fraction, representing a significant loss of gold.

There is a significant need for an improved method for processing many gold-bearing sulfide ores that avoids the high costs associated with oxidatively treating whole ores without the significant loss of gold associated with concentrating sulfide ores by flotation.

SUMMARY OF THE INVENTION

The present invention involves a method for processing gold-bearing sulfide ores to facilitate gold recovery without the burden of pressure oxidizing or roasting a whole ore and without the substantial loss of gold value associated with preparation of an ore concentrate by conventional flotation. It has been found that air, which is used as the flotation gas in conventional flotation, detrimentally affects flotation separation of gold-bearing sulfide minerals, and that significantly enhanced flotation performance may be obtained by maintaining the sulfide ore in an environment substantially free of air until a desired final flotation concentrate is obtained.

It is believed that oxygen gas present in air tends to oxidize the surface of certain gold-bearing sulfide mineral particles, with the effect that flotation of those sulfide mineral particles is reduced, resulting in a significant amount of sulfide mineral which fails to float during flotation, and, therefore, remains with the gangue.

By using a flotation gas that is deficient in oxygen gas relative to air, however, the problems associated with the use of air can be reduced. The result is an increased recovery of sulfide materials in the concentrate, and correspondingly, an increase in the recovery of gold in the concentrate.

In one embodiment, the gold-bearing sulfide minerals in a sulfide ore are maintained in an environment that is substantially free of oxygen beginning with comminution of the ore and ending with recovery of a desired final sulfide mineral concentrate. An oxygen deficient gas can be introduced prior to or during comminution to displace any air that may be present in the ore feed and to prevent air from entering during comminution. Oxygen in the air that would otherwise be present during comminution is, thereby, prevented from oxidizing newly exposed sulfide mineral surfaces created during comminution.

In one aspect, the present invention involves the advantageous utilization, in the processing of gold-bearing sulfide ores, of gases which may be separated from air. In one embodiment, a flotation operation, conducted substantially in the absence of oxygen gas, is combined with oxidative treating to decompose sulfide minerals, freeing gold for possible subsequent dissolution using a gold lixiviant, such as a cyanide. The preferred oxidative treating is pressure oxidation, although another oxidative treatment such as an oxidizing roast may be used instead. Such oxidative treating often requires a source of purified oxygen gas, which is often produced by separation from air in an oxygen plant. A by-product gas from such an oxygen plant is deficient in oxygen gas and rich in nitrogen gas. The by-product gas is, therefore, an ideal source of gas for use during comminution and/or flotation of a gold-bearing sulfide ore. This by-product gas is normally vented to the atmosphere in current gold processing operations and is, therefore, wasted.

DETAILED DESCRIPTION OF THE PREFERRED EMBODIMENT

The present invention provides a method for processing a gold-bearing sulfide mineral material, such as a gold-bearing sulfide ore, to facilitate recovery of the gold from the mineral material. The method involves preparation of a flotation concentrate in a manner that reduces problems associated with conventional flotation. It has, surprisingly, been found that the problems associated with concentrating a gold-bearing sulfide ore by conventional flotation may be significantly reduced by the use of a flotation gas which comprises a lower volume fraction of oxygen gas than is present in ambient air. Preferably, the flotation gas should be substantially free of oxygen gas. When air is used as a flotation gas, the oxygen gas in the air appears to detrimentally affect the floatability of the sulfide minerals. This may be due to a surface oxidation of sulfide mineral particles caused by the presence of the oxygen gas. The surface oxidation would tend to depress the sulfide mineral particles during flotation. Furthermore, the detrimental effects of oxygen gas may be further reduced by maintaining the ore in an environment that is substantially free of oxygen gas during comminution, mixing, pumping and all other processing steps until a final flotation concentrate has been obtained. For example, when multiple flotation steps are used, it is desirable to maintain the ore in an environment that is substantially free of oxygen gas between the flotation steps.

By reducing the apparently detrimental effects of oxygen gas, it is possible to recover a greater amount of the sulfide mineral in the flotation concentrate. The present invention, therefore, facilitates the recovery of gold from sulfide mineral material which may have previously been discarded as waste, either with the gangue in a flotation tail or as subgrade ore previously believed to be uneconomical for gold recovery.

Figure 1:
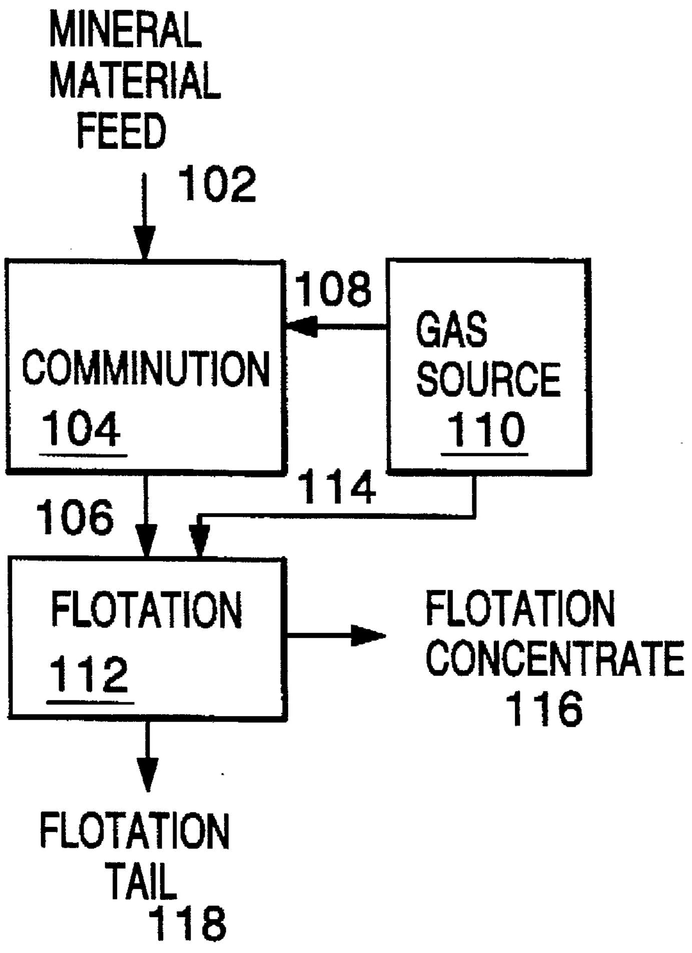
FIG. 1 is a flow diagram showing one embodiment of the present invention.

One embodiment in accordance with the present invention is shown in FIG. 1. With reference to FIG. 1, a gold-bearing mineral material feed 102 is provided for processing. The mineral material feed 102 may be any gold-bearing material comprising one or more sulfide mineral with which the gold is predominantly associated, and from which the gold is difficult to recover. The sulfide mineral could include one or more mineralogy including pyrite, marcasite, arsenopyrite, arsenous pyrite and pyrrhotite. The mineral material feed 102 is typically a whole ore, but may be a residue from other processing or a previously discarded tail.

The mineral material feed 102 is subjected to comminution 104 to obtain a particulate mineral material 106 having mineral particles of a size suitable for flotation. The particulate mineral material 106 is preferably sized such that at least 80 weight percent of particles in the particulate mineral material are smaller than about 100 mesh, more preferably smaller than about 150 mesh, and still more preferably smaller than about 200 mesh. The size at which 80 weight percent of a material passes is often referred to as a P80 size. Any suitable grinding and/or milling operation may be used for the comminution 104. Wet grinding and/or milling operations are generally preferred due to their relative ease and low cost compared to dry operations.

The comminution 104 is conducted in the presence of a blanketing gas 108 which is obtained from a gas source 110. During, or prior to, the comminution 104, the mineral material feed 102 is mixed with the blanketing gas 108, which contains oxygen gas, if at all, at a lower volume fraction of oxygen gas than is present in ambient air, to reduce problems that could be caused by the presence of air during the comminution 104. During the comminution 104, it is preferable to maintain a positive pressure of the blanketing gas 108 into any grinding and/or milling apparatus to assist mixing of the mineral material feed 102 with the blanketing gas 108, and to displace any air which may have been present with the mineral material feed 102.

After the comminution 104, the particulate mineral material 106 is subjected to flotation 112 to separate sulfide minerals, with which the gold is associated, from non-sulfide gangue material. During flotation, a slurry of the particulate mineral material 106 is aerated with a flotation gas 114 from the gas source 110. Any suitable flotation apparatus may be used for the flotation 112, such as a one or more of a conventional flotation cell or a flotation column. Preferably, however, the flotation apparatus is such that a small positive pressure of the flotation gas 114 may be maintained in the apparatus to prevent the entry of air into the apparatus. The flotation gas 114 has oxygen gas, if at all, at a reduced volume fraction relative to the volume fraction of oxygen gas in ambient air, to reduce the problems associated with using air as a flotation gas. Although not required, the flotation gas 114 will normally be of substantially the same composition as the blanketing gas 108 used in the comminution 104. Additionally, normal reagents may be added during or prior to the flotation 112 to assist in flotation separation. Such reagents may include frothing agents, activators, collectors, depressants, modifiers and dispersants. Preferably, the flotation 112 is conducted at ambient temperature and a natural pH produced by the mineral material. Operating conditions such as pH may, however, be adjusted as desired to optimize flotation separation for any particular mineral material.

Exiting from the flotation 112 is a flotation concentrate 116, which is recovered from the flotation froth and which is enriched in sulfide minerals, and consequently is also enriched in gold. Also exiting from the flotation 112 is a flotation tail 118, which is enriched in non-sulfide gangue materials, and consequently contains low levels of gold. The flotation concentrate 116 may be further processed to recover the gold by any suitable technique, if desired. Alternatively, the flotation concentrate 116 may be sold as a valuable commodity for processing by others to recover the gold.

As noted previously, the flotation gas 114 and the blanketing gas 108 each comprise oxygen gas, if at all, at a volume fraction that is less than the volume fraction of oxygen gas in ambient air. Preferably, however, the amount of oxygen gas in the flotation gas 114 and/or blanketing gas 108 is less than about 15 volume percent, and more preferably less than about 5 volume percent. Most preferably, both the flotation gas 114 and the blanketing gas 108 are substantially free of oxygen gas.

To aid in the understanding of the present invention, but not to be bound by theory, it is believed that oxygen gas, if present in any appreciable quantity, tends to oxidize the surface of particles of certain gold-bearing sulfide minerals, which can have the effect of depressing flotation of the gold-bearing sulfide mineral particles during the flotation 112. By reducing the amount of oxygen gas that comes into contact with a mineral material, it is believed that any surface oxidation effect is reduced, resulting in enhanced flotation of sulfide mineral particles and a corresponding increase in the amount of sulfide mineral, and therefore gold, recovered in the flotation concentrate 116. Therefore, it is preferred that the flotation gas 114 and the blanketing gas 108 consist essentially of components which could not oxidize the surface of gold-bearing sulfide mineral particles.

It is preferred that the flotation gas 114 and the blanketing gas 108 predominantly comprise one or more gases other than oxygen gas. Suitable gases include nitrogen, helium, argon and carbon dioxide. Preferably, one or more of these gases should comprise greater than about 95 volume percent of the flotation gas 114 and the blanketing gas 108, and more preferably greater than about 98 volume percent. Still more preferable is for the blanketing gas 108 and the flotation gas 114 to consist essentially of one or more of these gases. Nitrogen gas is particularly preferred because of its relatively low cost. Carbon dioxide is less preferred because it forms an acid when dissolved in water, which could corrode process equipment or produce conditions less conducive to optimum flotation.

The blanketing gas 108 and/or the flotation gas 114 may be introduced into process apparatus in any appropriate manner. Such gases may be fed under positive pressure or may be induced into the apparatus by creating a suction which pulls the gas in. Preferably, however, the apparatus is designed to substantially prevent introduction of air into comminution and flotation apparatus.

In one embodiment, the possible detrimental effects of any surface oxidation of sulfide mineral particles that may be present in a mineral material feed may be counteracted by the addition of a sulfidizing agent, to at least partially replace the oxidized coating with a sulfide coating. Any material capable of reacting to form the desired sulfide coating of the mineral particle could be used. Suitable sulfidizing agents include alkali metal sulfides and bisulfides, such as $Na_2S$, NaHS, etc. Such sulfidizing agents could be added just before or during any stage of the flotation 112.

With the present invention, greater than about 80 weight percent of sulfide minerals from the particulate mineral material 106 may be recovered in the flotation concentrate 116, and preferably greater than about 90 weight percent of those sulfide minerals are recovered in the flotation concentrate 116.

One major advantage of the process of the present invention is that, in addition to permitting a high recovery of gold-bearing sulfide minerals in the flotation concentrate 116, it permits a high rejection of gangue material into the flotation tail 118. Relative to the use of air as a flotation gas, the present invention permits the same recovery of gold to be obtained in a concentrate of smaller weight. This provides a significant economic advantage because less gangue material is present in the concentrate, from which the gold must ultimately be separated to produce a purified gold product, if desired.

The gas source 110 may be any source providing a suitable flotation gas 114 and blanketing gas 108. One preferred gas source 110 is a facility in which nitrogen gas is separated from air, with the separated nitrogen gas being used as the blanketing gas 108 and the flotation gas 114. Several processes are known for separating nitrogen from air, including cryogenic separation and membrane separation. One particularly preferred gas source 110 is an oxygen plant, which is commonly found at existing facilities where gold-bearing sulfide ores are processed. An oxygen plant is typically required, for example, when a pressure oxidation operation or an oxidative roasting operation is used in the processing of gold-bearing sulfide ores. In the oxygen plant, oxygen is separated from air, such as by cryogenic separation or membrane separation, and the separated oxygen gas is used in the pressure oxidation or oxidative roasting operation. A by-product of such an oxygen plant is an effluent gas stream which is enriched in nitrogen gas and is suitable for use as the blanketing gas 108 and/or the flotation gas 114. This by-product stream has previously been vented to the atmosphere and has, therefore, been wasted. With the present invention, however, the by-product stream may be beneficially used to produce the flotation concentrate 116, in addition to using the oxygen gas product stream for the pressure oxidation or oxidative roasting operation.

Figure 2:
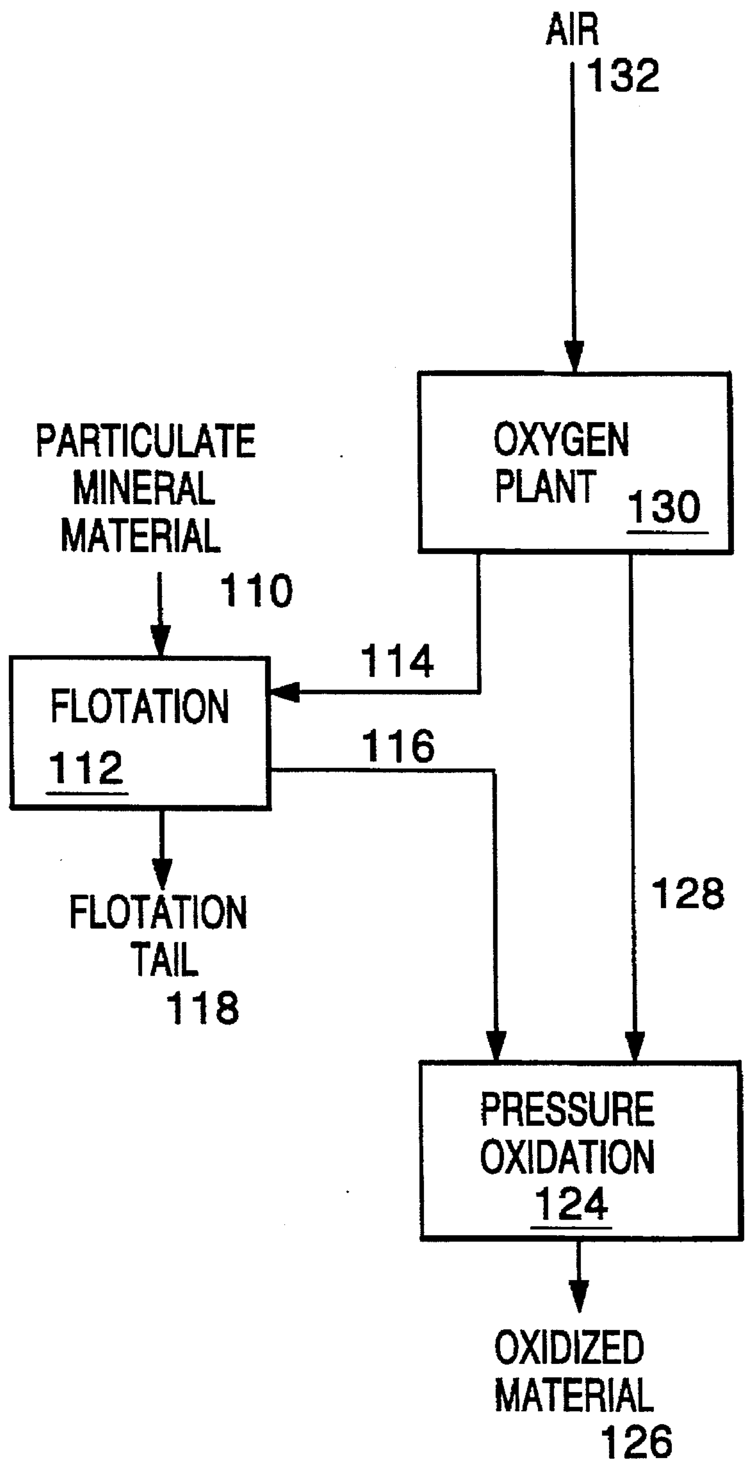
FIG. 2 is a flow diagram showing another embodiment of the present invention.

FIG. 2 shows one embodiment of the present invention in which both the oxygen gas product stream and the nitrogen gas by-product stream from an oxygen plant are both used to process gold-bearing sulfide mineral material. Referring to FIG. 2, particulate mineral material 110 is subjected to the flotation 112 to produce the flotation concentrate 116 and the flotation tail 118, as previously described. The flotation gas 114 is a nitrogen gas enriched by-product stream from an oxygen plant 130, in which air 132 is separated into an oxygen enriched gas stream and nitrogen enriched gas stream. The flotation concentrate 116, which is enriched in gold-bearing sulfide minerals, is subjected to pressure oxidation 124 to decompose sulfide minerals, producing an oxidized material 126 from which the gold could be recovered by dissolution using any suitable gold lixiviant, such as a cyanide. The pressure oxidation 124 involves treating a slurry of the flotation concentrate 116 in an autoclave at a temperature of greater than about 150° C. and an elevated pressure in the presence of an overpressure of a treating gas 128, which is rich in oxygen. It should be noted that other oxidative treating steps could be used instead of the pressure oxidation 124. For example, an oxidative roasting or biooxidation could be used to produce the oxidized material 126 using the treating gas 128.

Figure 3:
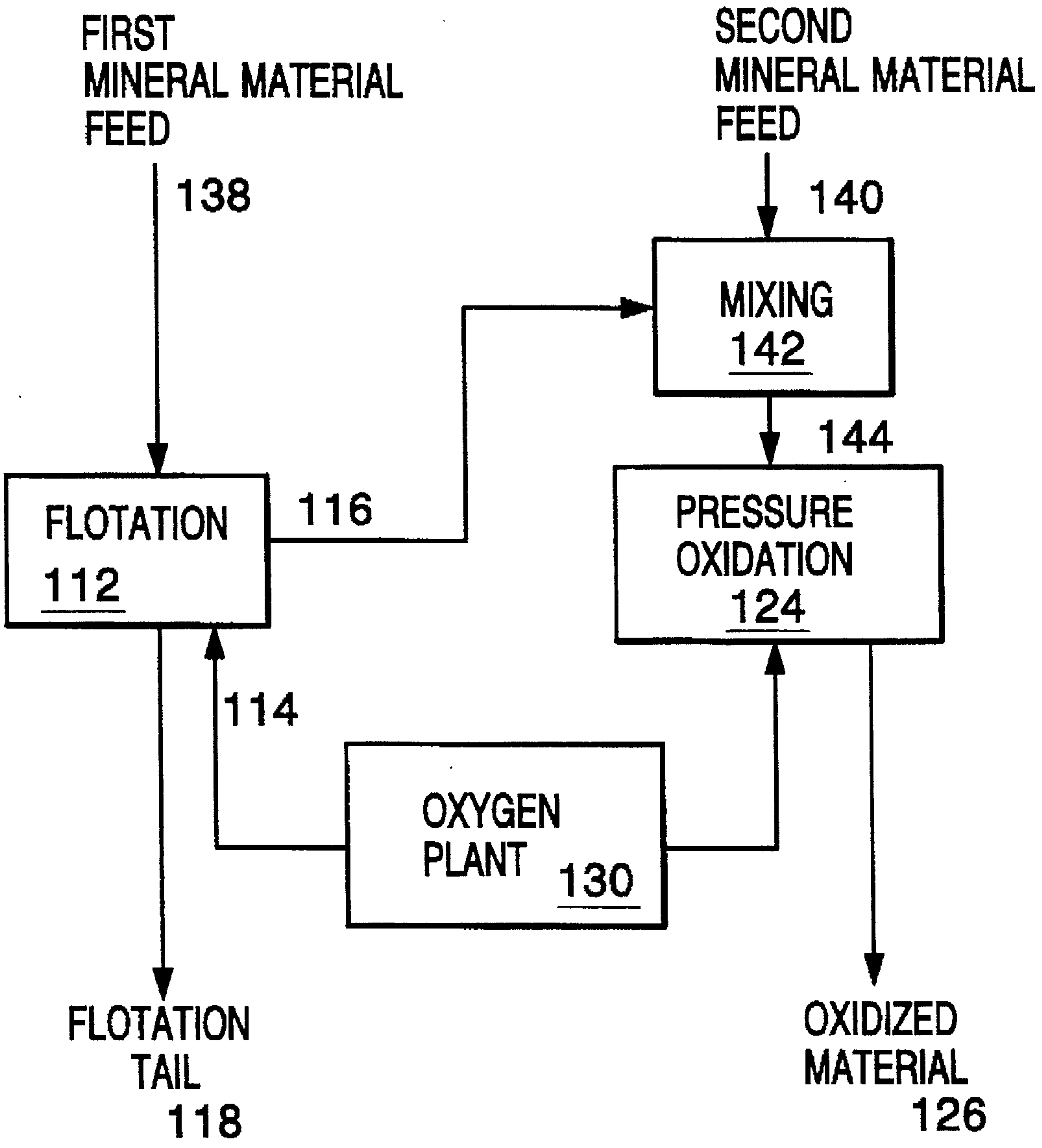
FIG. 3 is a flow diagram showing yet another embodiment of the present invention.

A further embodiment in accordance with the present invention is shown in FIG. 3 which uses the product and by-product gas streams from an oxygen plant to process a gold-bearing sulfide mineral material provided in two separate feed streams. Referring to FIG. 3, a particulate first mineral material feed 138 is subjected to the flotation 112 to produce the flotation concentrate 116 and the flotation tail 118, as previously described. The flotation gas 114 is a gas stream enriched in nitrogen from the oxygen plant 130. A particulate second mineral material feed 140 is combined with the flotation concentrate 116 in a mixing step 142. The combined stream 144, in the form of a slurry, is subjected to the pressure oxidation 124 to produce the oxidized material 126, from which gold could be recovered.

One advantage of the embodiment shown in FIG. 3 is that it permits the processing of multiple ores having different characteristics. For example, the first mineral material feed 138 may comprise a lower grade gold-bearing sulfide ore than the second mineral material feed, which may comprise a higher grade gold-bearing sulfide ore. The higher grade ore may be suitable for pressure oxidation in a whole ore form, whereas the lower grade ore must be upgraded to a concentrate form to be suitable for pressure oxidation.

Alternatively, the second mineral material feed may comprise a gold-bearing sulfide ore which has a significant amount of carbonate material which would consume acid produced during the pressure oxidation 124, and which could, therefore, detrimentally interfere with proper operation of the pressure oxidation 124. A high sulfide sulfur content in the flotation concentrate 116, however, tends to produce additional acid during pressure oxidation to at least partially offset the acid consuming effect of carbonate material in the second mineral material feed. Almost all carbonate material that may have been present in the first mineral material feed, if any, would ordinarily have been removed during the flotation 112.

The present invention is further described by the following examples, which are intended to be illustrative only and are not intended to limit the scope of the present invention.

EXAMPLES

Examples 1–6

Examples 1–6 demonstrate the use of nitrogen gas as a flotation gas during flotation of a gold-bearing sulfide ore to produce a sulfide enriched concentrate which could be further processed to recover gold, if desired.

For each of Examples 1–6, an ore sample is provided from Santa Fe Pacific Gold Corporation's Lone Tree Mine in Nevada. The ore samples are of a low grade sulfide ore which would be unsuitable for economic pressure oxidation in a whole ore form. A representative assay of an ore sample is shown in

TABLE 1

| LONE TREE SUBGRADE SULFIDE ORE REPRESENTATIVE HEAD ANALYSIS | |
|---|---|
| Gold | 0.063 oz/st[(1)] |
| Silver | 0.05 oz/st[(1)] |
| Total Sulfur | 1.75 wt. % |
| Sulfide Sulfur | 1.66 wt. % |
| Arsenic | 1440 ppm. by wt. |

[(1)]ounces per short ton of ore

For each example, the ore sample is ground to the desired size. A first portion of the ore sample is subjected to flotation in a laboratory-scale flotation cell using air as the flotation gas. A second portion of the ore sample is subjected to flotation under the same conditions, except using a flotation gas which consists essentially of nitrogen gas. During each flotation test, a flotation froth is collected from the top of the flotation cell to recover a flotation concentrate which is enriched in sulfide minerals, and which is, therefore, also enriched in gold. The flotation tail is that material which is not collected in the froth. For each flotation test, the flotation conditions are substantially as follows: A natural pH and addition of potassium amyl xanthate and mercaptobenzothiazole as collectors, copper sulfate for activation of sulfides and MIBC as a frother. Flotation times range from 20 to 30 minutes.

The results for examples 1–6 are shown tabularly in Table 2 and graphically in FIGS. 4–7 and reveal a significant increase in the amount of gold recovered in the concentrate when nitrogen gas is used as the flotation gas, especially at smaller grind sizes.

TABLE 2

LONE TREE SUBGRADE BATCH TESTS

| Example | Grind P80 Mesh[(1)] | Concentrate Grade oz gold/st[(2)] | | Tail Grade oz gold/st[(2)] | | Concentrate Recovery wt. %[(4)] | | Gold Reporting to Concentrate %[(5)] | |
|---|---|---|---|---|---|---|---|---|---|
| | | air | nitrogen | air | nitrogen | air | nitrogen | air | nitrogen |
| 1 | 100 | 0.31 | 0.35 | 0.19 | 0.20 | 15 | 15 | 75 | 75 |
| 2 | 150 | 0.28 | 0.31 | 0.21 | 0.16 | 15 | 16 | 71 | 79 |
| 3 | 200 | 0.33 | 0.29 | 0.21 | 0.16 | 15 | 19 | 74 | 81 |
| 4 | 270 | 0.22 | 0.25 | 0.22 | 0.12 | 20 | 24 | 72 | 86 |
| 5 | 325 | 0.23 | 0.20 | 0.22 | 0.16 | 20 | 25 | 73 | 81 |
| 6 | 400 | 0.14 | 0.14 | 0.29 | 0.12 | 29 | 33 | 67 | 85 |

Figure 4:
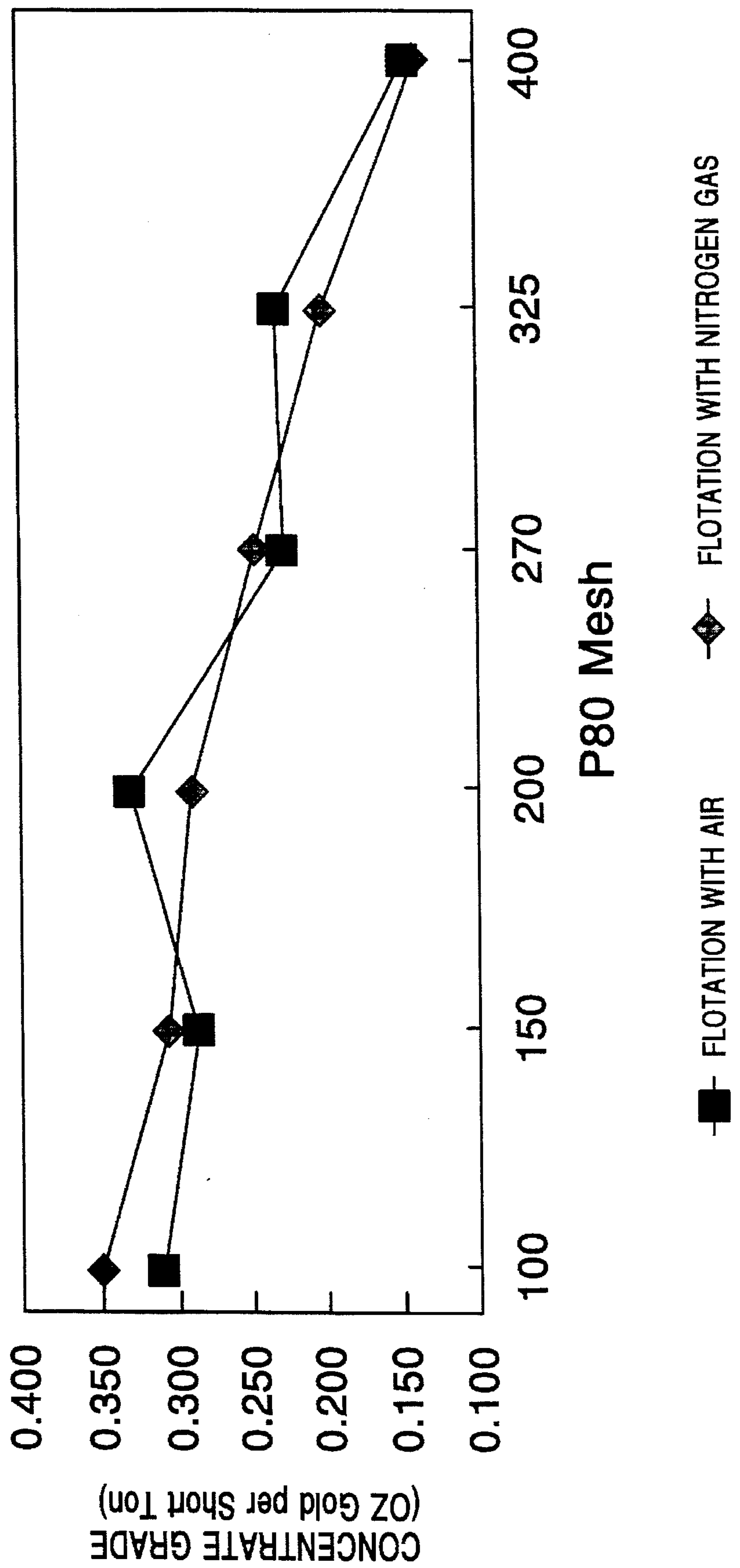
FIG. 4 is a graph of the grade of concentrate recovered from flotation versus grind size Examples 1–6.
Figure 5:
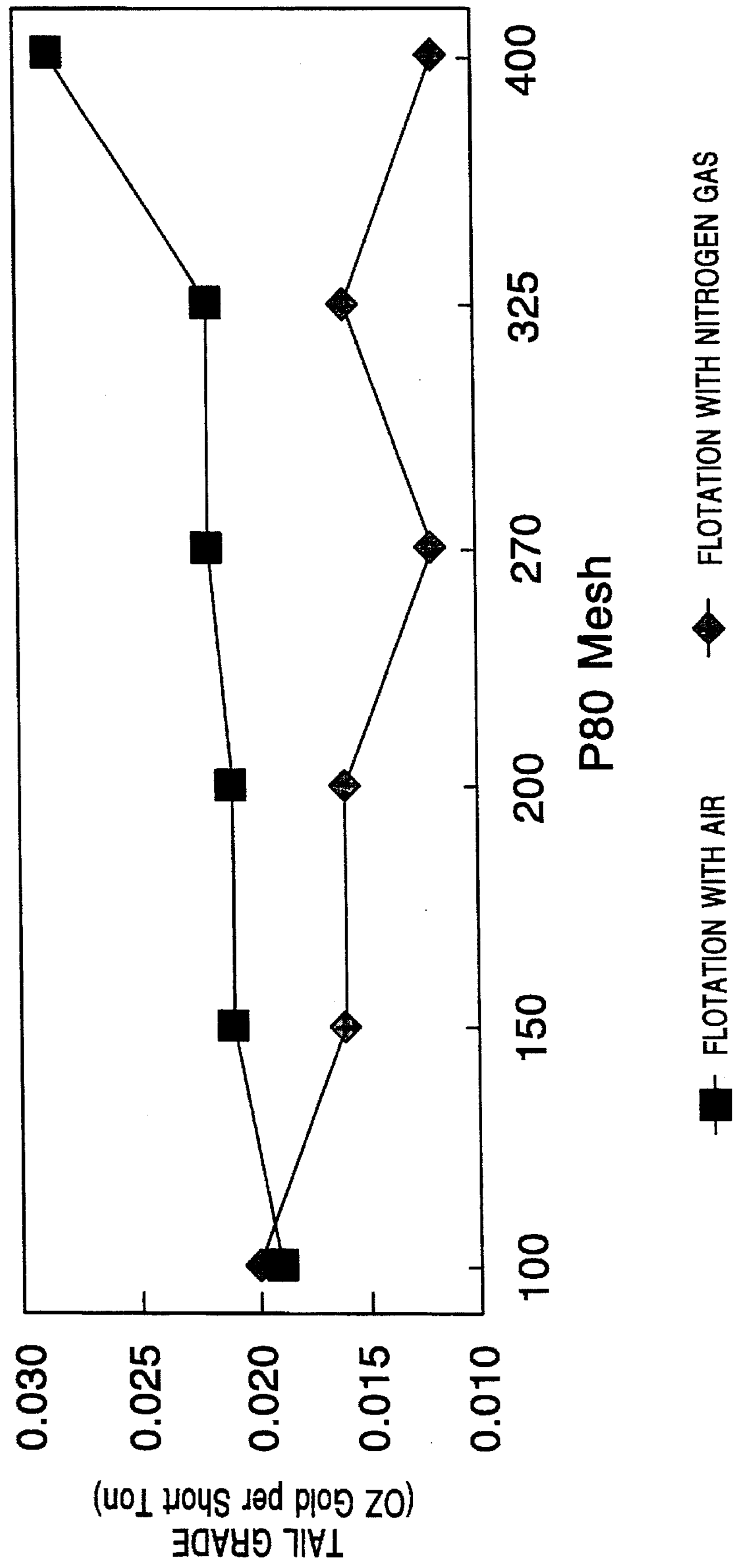
FIG. 5 is a graph of the grade of tails from flotation versus grind size Examples 1–6.
Figure 6:
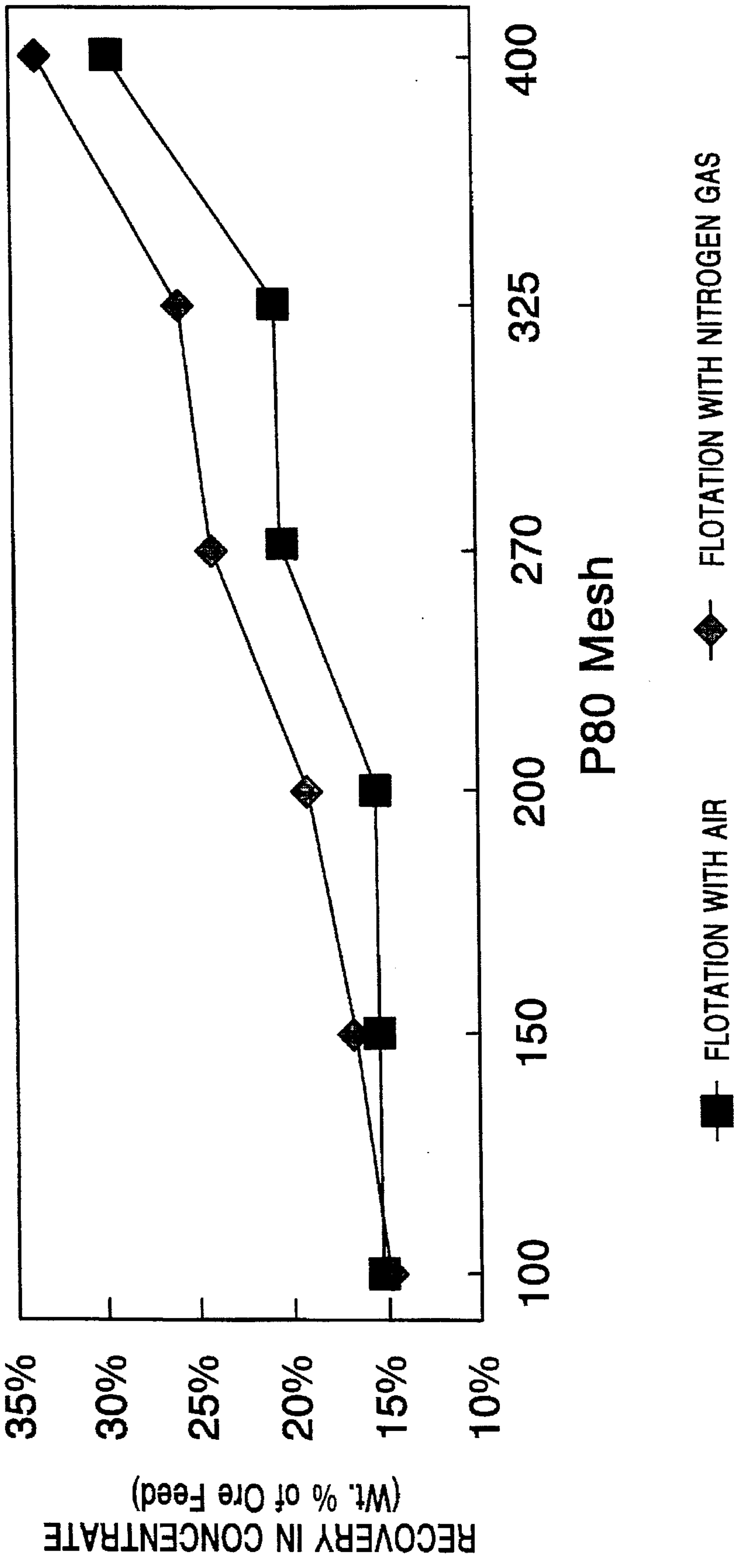
FIG. 6 is a graph of concentrate weight percent recovery from flotation versus grind size for Examples 1–6.
Figure 7:
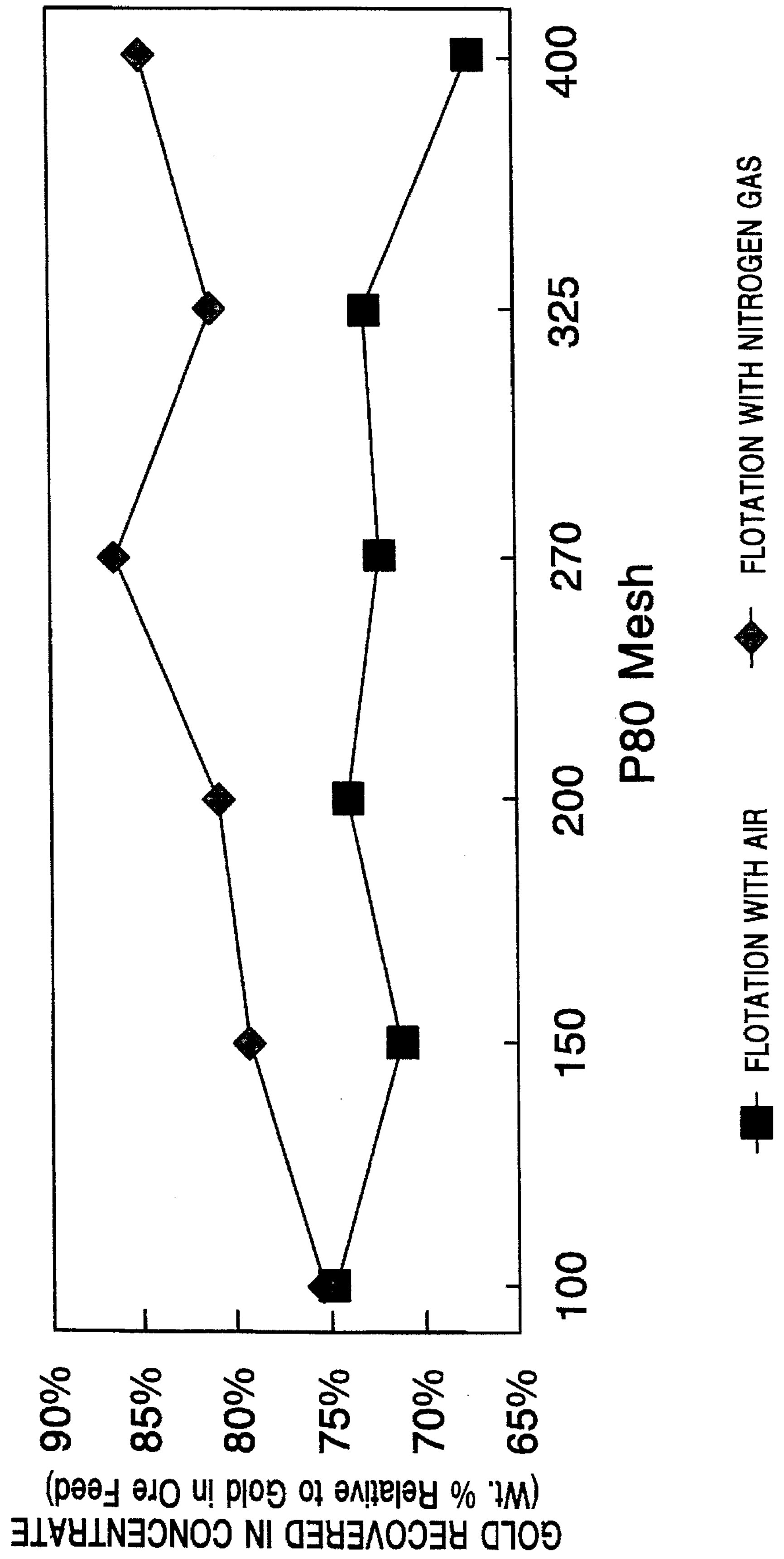
FIG. 7 is a graph of gold recovered in concentrate from flotation versus grind size for Examples 1–6.

[(1)]80 weight percent of material passing the indicated size
[(2)]ounces of gold per short ton of concentrate
[(3)]ounces of gold per short ton of tail
[(4)]weight percent of ore sample feed reporting to concentrate
[(5)]% of gold in ore sample feed reporting to concentrate FIG. 4 graphically shows the grade of the flotation concentrate (measured as ounces of gold per short ton of concentrate material) as a function of the grind size. As seen in FIG. 4, no identifiable effect on the grade of the concentrate is apparent from using nitrogen gas relative to using air in the flotation. FIG. 5, however, shows that the flotation tail, at smaller grind sizes, contains a significantly lower gold value when using nitrogen gas as a flotation gas than when using air. Therefore, when using nitrogen gas, more of the gold-bearing sulfide minerals are recovered in the concentrate, apparently without any detrimental effect to the grade of the concentrate recovered. FIG. 6 shows that the amount of material recovered in the concentrate may be significantly higher when using nitrogen gas as a flotation gas than when using air, especially at the smaller grind sizes. FIG. 7 shows that gold recovery in the concentrate may be increased by almost 15% at a P80 grind of 270 mesh, when using nitrogen gas as a flotation gas as opposed to air, again without detrimental effect to the grade of concentrate recovered.

It should be noted that at a P80 grind of 100 mesh, there is no significant difference in flotation performance when using nitrogen gas as opposed to air as the flotation gas. It is, therefore, surprising and unexpected that the performance using nitrogen gas would improve so markedly relative to air at the smaller grind sizes. Typically, it is expected that flotation performance should improve with a smaller grind size due to a more complete liberation of sulfide minerals from non-sulfide gangue material. As seen in FIG. 7, however, the gold recovery in the concentrate when using air as the flotation gas is flat, at best. When using nitrogen gas, however, gold recovery generally increases with decreased grind size due to increased sulfide mineral particle liberation, as would normally be expected.

One way to explain the unexpectedly poor flotation performance when using air, to assist in the understanding in the present invention but not to be bound by theory, is that some detrimental chemical process may be occurring when air is used as a flotation gas, with the detrimental chemical process counteracting the normally beneficial effects of a smaller grind size. It was observed that when air is used as the flotation gas, the pH of the slurry in the flotation cell drops rapidly for several minutes, sometimes falling by as much as 0.5–2 pH units. Therefore, it appears that oxygen in the air may be oxidizing the surface of sulfide mineral particles, producing sulfuric acid and lowering the slurry pH. Such surface oxidization of the sulfide mineral particles could render them less responsive to flotation. As the grind becomes smaller, the surface area available for oxidation of the sulfide minerals increases significantly and, accordingly, any beneficial effect from more complete liberation of sulfide mineral due to the smaller grind size is offset by increased surface oxidation, further depressing flotation of the sulfide mineral particles. Nitrogen gas, however, would not oxidize the surface of sulfide minerals and, therefore, permits better flotation of sulfide mineral particles, resulting in a higher recovery of sulfide minerals at the smaller grind sizes, as would normally be expected.

Example 7

This example further demonstrates the beneficial use of nitrogen gas in the flotation of gold-bearing sulfide ores, and the use of a rougher-scavenger-cleaner arrangement of flotation to enhance recovery of concentrate.

A flotation pilot plant is operated using a low grade sulfide ore from the Lone Tree Mine, as previously described with Examples 1–6. The pilot plant flow is shown in FIG. 8.

Figure 8:
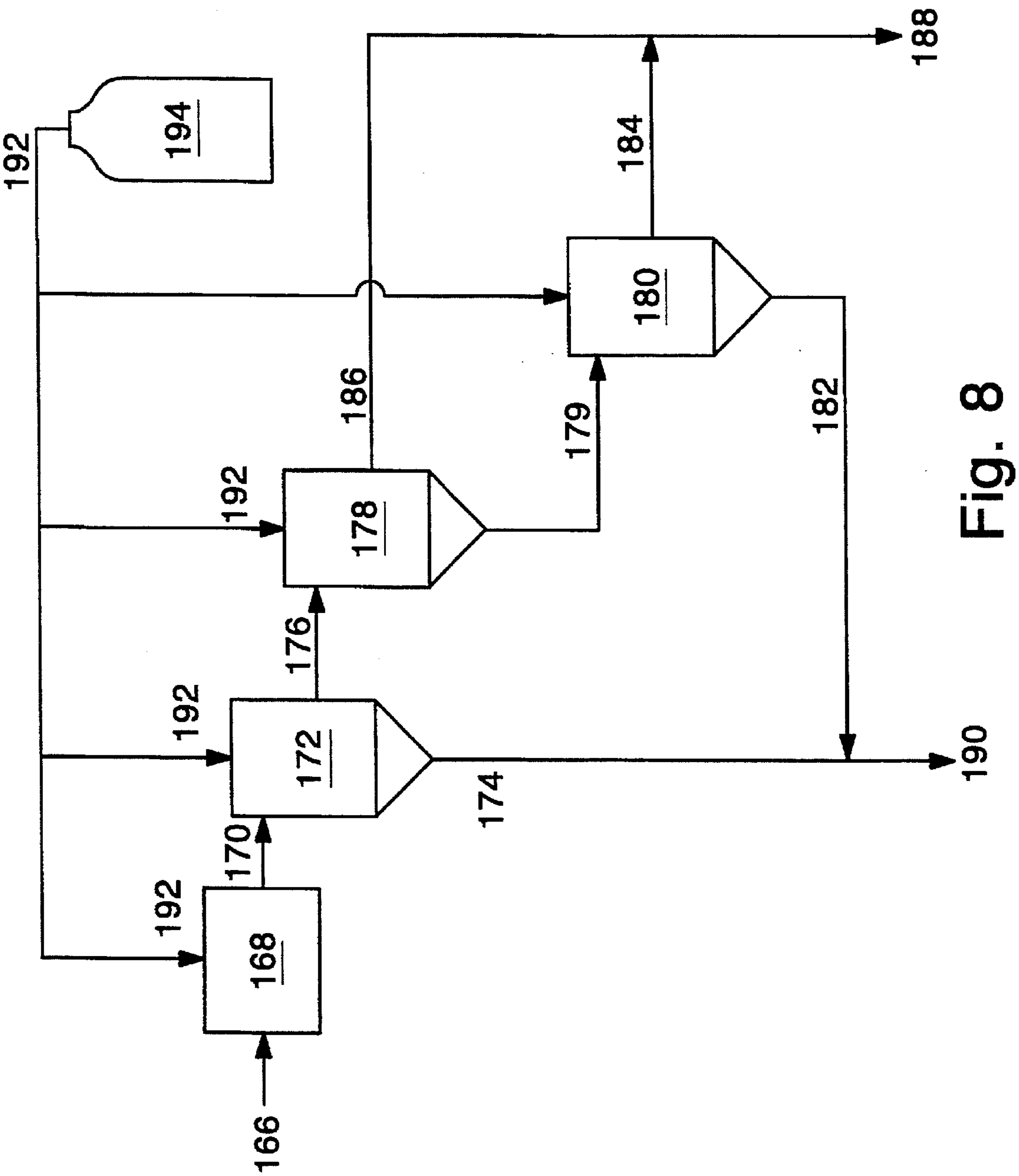
FIG. 8 is a flow diagram for one embodiment of the present invention relating to a pilot plant for Example 7.

With reference to FIG. 8, the ore sample 166 is subjected to comminution 168 in a ball mill to a P80 size of 270 mesh. The ground ore, in a slurry 170, is introduced into a rougher flotation step 172. In the rougher flotation step 172, an initial flotation separation is made with a rougher concentrate 174 being collected with the flotation froth and a rougher tail 176 being sent to a scavenger flotation step 178, material collected in the flotation froth of the scavenger flotation step 178 is repulped and introduced, as a slurry 179, to a cleaner flotation step 180, where a final flotation separation is made to produce a cleaner concentrate 182 from the froth and a cleaner tail 184. The cleaner tail 184 is combined with a scavenger tail 186, from the scavenger flotation step 178, to produce the final tail 188. The rougher concentrate 174 and the cleaner concentrate 182 are combined to form a final concentrate 190. In this example, the rougher flotation step 172 is accomplished in a single dual compartment flotation cell, the scavenger flotation step 178 is accomplished in a series of three dual compartment flotation cells, and the cleaner flotation step 180 is accomplished in a series of three dual compartment flotation cells. As shown in FIG. 8, nitrogen gas 192 is supplied from gas tank 194 and is fed to each of the comminution step 168, the rougher flotation step 172, the scavenger flotation step 178 and the cleaner flotation step 180. The nitrogen gas 192 is used as the flotation gas in each of the flotation steps and is used as a blanketing gas to prevent air from oxidizing ore particles during the comminution 168. The nitrogen gas is also used to blanket all other process equipment, not shown, such as pumps and mixing tanks. Gold-bearing sulfide minerals in the ore sample 166 are, therefore, maintained in a substantially air-free environment through the entire pilot plant, until the gold-bearing sulfide minerals have been recovered in a desired concentrate product.

The results of the pilot plant are shown in Table 3, which shows that the final concentrate 190 from the pilot plant is of a higher quality than the concentrates shown in Examples 1–6. Addition of the scavenger flotation step 178 and the cleaner flotation step 180 in the pilot plant significantly improves the grade of concentrate finally recovered, without any appreciable loss of gold recovery.

TABLE 3

LONE TREE PILOT PLANT

| Example | Grind P80 Mesh[1] | Final Concentrate Grade oz gold/st[2] | Tail Grade oz gold/st[3] | Final Concentrate Recovery wt %[4] | Gold Reporting to Final Concentrate % gold recovery[5] |
|---|---|---|---|---|---|
| 7 | 270 | 0.57 | .0095 | 9.4 | 86.4 |

[1]80 weight percent of material passing the indicated size
[2]ounces of gold per short ton of respective concentrate
[3]ounces of gold per short ton of final tail
[4]weight percent of ore sample feed reporting to respective concentrate
[5]% of gold in concentrate relative to feed for the respective flotation step Example 8

Laboratory tests are performed on samples of a low grade gold-bearing sulfide ore from Santa Fe Pacific Gold Corporation's Twin Creeks Mine in Nevada. A representative analysis of an ore sample is shown in Table 4. For each test, a sample is ground to the appropriate size and a portion of each sample is then subjected to flotation using air as a flotation gas and another portion is subjected to flotation using nitrogen as a flotation gas. Substantially the same flotation conditions are used as described for Examples 1–6.

TABLE 4

Twin Creeks SUBGRADE SULFIDE ORE REPRESENTATIVE HEAD ANALYSIS

| | |
|---|---|
| Gold | 0.085 oz/st[1] |
| Silver | 0.28 oz/st[1] |
| Total Sulfur | 6.45 wt. % |
| Sulfide Sulfur | 6.27 wt. % |
| Arsenic | 1630 ppm by wt. |

[1]ounces per short ton of ore

Figure 9:
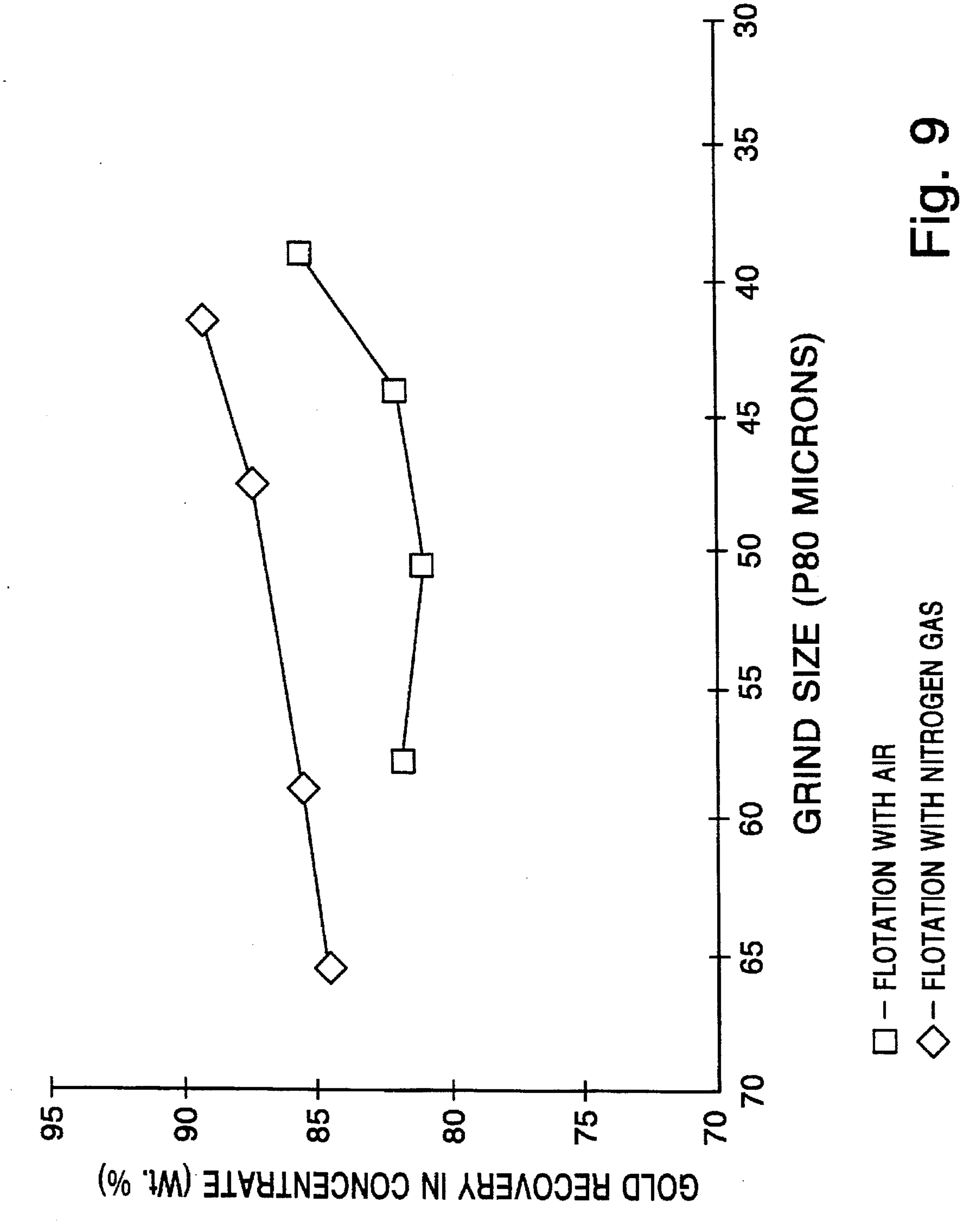
FIG. 9 is a graph of gold recovery in concentrate from flotation versus grind size for Examples 8–15.

The results of Example 8 are graphically shown in FIG. 9 which shows a plot of gold recovery in the concentrate as a function of grind size. As seen in FIG. 9, the use of nitrogen gas generally results in a significantly higher recovery of gold in the concentrate compared to the use of air as a flotation gas.

The present invention has been described with reference to specific embodiments of the present invention. According to the present invention, however, any of the features shown in any embodiment may be combined in any way with any other feature of any other embodiment. For example, any feature shown in any one of FIGS. 1–3 and 8 can be combined with any other feature shown in any of those figures. Furthermore, while various embodiments of the present invention have been described in detail, it is apparent that modifications and adaptations to those embodiments will occur to those skilled in the art. It is to be expressly understood that such modifications and adaptations are within the scope of the present invention, set forth in the following claims.

What is claimed is:

1. A method for processing a gold-bearing mineral material having a sulfide mineral with which gold is associated, the method comprising the steps of:

(a) providing a particulate gold-bearing mineral material, wherein said mineral material comprises gold and a sulfide mineral with which said gold is associated, and wherein said mineral material also comprises non-sulfide material as gangue;

(b) subjecting said mineral material to flotation with a flotation gas to separate said mineral material into at least two fractions, a first fraction being a flotation concentrate, collected from flotation froth, enriched in said sulfide mineral and said gold and a second fraction being a flotation tail enriched in said non-sulfide material and depleted in said gold;

wherein said flotation gas comprises no greater than about 15 volume percent of oxygen gas;

and wherein, when pyrrhotite is present in said mineral material, said flotation concentrate is enriched in said pyrrhotite.

2. The method of claim 1, wherein:

said flotation gas comprises a by-product gas, enriched in nitrogen gas relative to air, from an oxygen plant in which an oxygen enriched gas is produced from air.

3. The method of claim 1, wherein:

said flotation gas comprises less than about 5 volume percent oxygen gas.

4. The method of claim 1, wherein:

said flotation gas is substantially free of oxygen gas.

5. The method of claim 1, wherein:

said flotation gas comprises greater than about 85 volume percent nitrogen gas.

6. The method of claim 1, wherein:

said flotation gas comprises greater than about 95 volume percent nitrogen gas.

7. The method of claim 1, wherein said flotation gas is substantially free of components capable of oxidizing, during said flotation, sulfide sulfur in said sulfide mineral.

8. The method of claim 1, wherein:

said flotation gas comprises greater than about 95 volume percent of gas selected from the group consisting of nitrogen gas, helium gas, argon gas, carbon dioxide gas and combinations thereof.

9. The method of claim 1, wherein:

said step of providing a particulate gold-bearing mineral material comprises comminuting a coarse gold-bearing mineral material in the presence of a blanketing gas comprising no greater than about 15 volume percent of oxygen gas.

10. The method of claim 1, wherein:

said step of providing a particulate gold-bearing mineral material comprises comminuting a coarse gold-bearing mineral material in an environment which is substantially free of oxygen gas.

11. The method of claim 10, wherein:

said sulfide mineral is maintained in an environment that is substantially free of oxygen between and during said comminution and said flotation.

12. The method of claim 1, wherein:

subsequent to said flotation, at least a portion of said flotation concentrate is subjected to oxidative treating in the presence of a treating gas, which is enriched in oxygen gas relative to ambient air, to oxidize at least a portion of sulfide sulfur in said sulfide mineral, to assist in freeing at least a portion of said gold from association with said sulfide mineral and to facilitate possible subsequent recovery of said gold.

13. The method of claim 12, wherein:

said oxidation treating comprises biooxidation of said sulfide material.

14. The method of claim 12, wherein:

said flotation gas comprises an oxygen deficient by-product gas from an oxygen plant which produces an oxygen enriched gas from air; and in said step of oxidative treating, said treating gas comprises at least a portion of said oxygen enriched gas from said oxygen plant.

15. The method of claim 12, wherein:

said oxidative treating comprises pressure oxidizing a slurry of said sulfide mineral at an elevated temperature and an elevated pressure in the presence of said treating gas.

16. The method of claim 12, wherein:

said oxidative treating comprises roasting of said sulfide mineral at an elevated temperature in the presence of said treating gas.

17. The method of claim 12, wherein:

subsequent to said step of flotation, at least a portion of said flotation concentrate is blended with a whole ore comprising a sulfide mineral to form a blend; and said blend is subjected to said oxidative treating.

18. The method of claim 17, wherein:

said oxidative treating comprises pressure oxidizing a slurry of said sulfide mineral at an elevated temperature and an elevated pressure in the presence of said treating gas;

said whole ore comprises carbonate material which consumes acid during said pressure oxidizing; and said flotation concentrate is enriched in sulfide sulfur which, during said pressure oxidizing, contributes to production of sulfuric acid which at least partially offsets acid consumption by said carbonate material.

19. The method of claim 12, wherein:

following said oxidative treating, gold which has been freed from association with said sulfide mineral during pressure oxidation, is recovered by dissolution into a leach solution comprising a lixiviant for gold.

20. The method of claim 1, wherein:

said flotation concentrate comprises greater than about 80 weight percent of said sulfide mineral from said mineral material.

21. The method of claim 1, wherein:

said flotation concentrate comprises greater than about 90 weight percent of said sulfide mineral from said mineral material.

22. The method of claim 1, wherein:

said flotation concentrate is enriched in, and said flotation tail is depleted in, said gold and at least one of pyrite, marcasite, arsenopyrite, arsenous pyrite and pyrrhotite.

23. A method for processing a gold-bearing mineral material having a sulfide mineral with which gold is associated, the method comprising the steps of:

(a) providing a coarse gold-bearing mineral material, wherein said mineral material comprises gold and a sulfide mineral with which said gold is associated, and wherein said mineral material also comprises non-sulfide material as gangue;

(b) mixing a blanketing gas with said mineral material;

(c) comminuting said course mineral material in the presence of said blanketing gas to form a particulate gold-bearing mineral material;

(d) subjecting said particulate mineral material to flotation with a flotation gas, to separate said mineral material into at least two fractions, a first fraction, collected from flotation froth, being a flotation concentrate enriched in said sulfide mineral and said gold, and a second fraction being a flotation tail enriched in said non-sulfide material and depleted in said gold;

wherein, when said blanketing gas comprises oxygen gas said blanketing gas comprises less than about 15 volume percent of said oxygen gas.

24. The method of claim 23, wherein:

during said mixing, said blanketing gas displaces air from the vicinity of said coarse mineral material.

25. The method of claim 23, wherein:

said blanketing gas comprises less than about 5 volume percent oxygen gas.

26. The method of claim 23, wherein:

said blanketing gas comprises greater than about 95 volume percent nitrogen gas.

27. The method of claim 23, wherein:

said blanketing gas and said flotation gas have substantially the same gas composition.

28. A method for using diverse gas streams separated from air to assist in processing a gold-bearing mineral material having a sulfide mineral with which gold is associated, the method comprising the steps of:

(a) separating a quantity of air into at least two gas streams, with a first gas stream being enriched in nitrogen gas relative to said air and a second gas stream being enriched in oxygen gas relative to said air;

(b) providing a feed of particulate mineral material comprising gold and a sulfide mineral with which said gold is associated, and wherein said mineral material also comprises non-sulfide material;

(c) subjecting at least a portion of said mineral material to flotation to separate said mineral material into at least two fractions, with a first fraction being a flotation concentrate which is enriched in said sulfide mineral and said gold relative to said mineral material and said gold in said feed and a second fraction being a flotation tail which is enriched in said non-sulfide material and depleted in said gold relative to said mineral material in said feed;

said flotation comprising subjecting at least a portion of said feed to a flotation gas including at least a portion of said first gas stream, which is enriched in nitrogen gas; and (d) oxidative treating of at least a portion of said mineral material, said oxidative treating comprising contacting said portion of said mineral material with at least a portion of said second gas stream, which is enriched in oxygen gas, to oxidize at least a portion of sulfide sulfur in said sulfide mineral to produce an oxidized material in which at least some of said gold is freed from association with said sulfide mineral, facilitating possible subsequent recovery of gold from said oxidized material.

29. The method of claim 28, wherein:

said step of providing said feed of particulate mineral material comprises comminuting a coarse mineral material in the presence of at least some of said first gas stream, which is enriched in nitrogen gas.

30. The method of claim 28, wherein:

at least a portion of said mineral material, which is subjected to said step of oxidative treating, comprises at least a portion of said flotation concentrate.

31. The method of claim 28, wherein:

at least a portion of said mineral material, which is subjected to said step of oxidative treating, comprises at least a portion of said feed blended with at least a portion of said flotation concentrate.

32. The method of claim 28, wherein:

said oxidative treating comprises pressure oxidizing a slurry of said sulfide mineral at an elevated temperature and an elevated pressure in the presence of said second gas stream, which is enriched in oxygen gas.

33. The method of claim 28, wherein:

said oxidative treating comprises oxidative roasting of said mineral material at an elevated temperature in the presence of said second gas stream, which is enriched in oxygen.

34. The method of claim 28, wherein:

said first gas stream comprises greater than about 95 volume percent nitrogen gas.

35. A method for processing a gold-bearing mineral material having a sulfide mineral with which said gold is associated, the method comprising the steps of:

(a) providing, in at least two portions, particulate mineral material comprising gold, with a first feed portion of said mineral material having a first average gold concentration and a second feed portion of said mineral material having a second average gold concentration that is smaller than said first average gold concentration;

each of said first feed portion and said second feed portion comprising a sulfide mineral with which gold is associated and from which gold is difficult to recover, and each of said first feed portion and said second feed portion also comprising non-sulfide material;

(b) oxidative treating of said first feed portion, said oxidative treating comprising contacting said first feed portion with a treating gas comprising oxygen gas, to oxidize at least a portion of sulfide sulfur in said sulfide mineral to produce an oxidized material in which at least some of said gold is freed from association with said sulfide mineral; and (c) subjecting said second feed portion, but not said first feed portion, to flotation, comprising treating a liquid slurry of said second feed portion with a flotation gas to separate said second feed portion into at least two fractions, a first fraction being a flotation concentrate enriched in said sulfide mineral and said gold, and a second fraction being a flotation tail enriched in said non-sulfide material and depleted in said gold;

said flotation gas comprising no greater than about 15 volume percent of oxygen gas.

36. The method of claim 35, wherein:

said flotation gas comprises less than about 5 volume percent oxygen gas.

37. The method of claim 35, wherein:

said flotation gas comprises greater than about 95 volume percent nitrogen gas.

38. The method of claim 35, wherein:

at least a portion of said flotation concentrate is blended with said first feed portion prior to said step of oxidative treating.

39. The method of claim 35, wherein:

said oxidative treating comprises at least one of: (i) pressure oxidizing a slurry of said first feed portion of said mineral material in the presence of said treating gas at elevated temperature and at elevated pressure, (ii) oxidative roasting of said first feed portion in the presence of said treating gas at elevated temperature, and (iii) biooxidation of said first feed portion in the presence of said treating gas.

* * * * *